United States Patent

[11] 3,548,749

| [72] | Inventor | David R. Dreitzler<br>Huntsville, Ala. |
|---|---|---|
| [21] | Appl. No. | 795,184 |
| [22] | Filed | Jan. 30, 1969 |
| [45] | Patented | Dec. 22, 1970 |
| [73] | Assignee | to the United States of America as represented by the Secretary of the Army |

[54] TWO BATTERY TIME DELAY SQUIB CIRCUIT
2 Claims, 1 Drawing Fig.

[52] U.S. Cl. .................................................... 102/70.2,
307/299; 317/80
[51] Int. Cl. .................................................... F42b 9/08,
F42c 13/00
[50] Field of Search .......................................... 317/80, 79;
102/70.2; 307/305, 301, 252, 272, 299

[56] References Cited
UNITED STATES PATENTS
2,514,434  7/1950  Windes ........................ 102/70.2

2,909,122  10/1959  Shoemaker et al. .......... 102/70.2
3,171,063  2/1965  Hutchison et al. ............ 317/80
3,312,869  4/1967  Werner ......................... 317/80

OTHER REFERENCES

Gutzwiller et al., Silicon Controlled Rectifier Manual, N.Y., General Electric, 1964, Chapter 4.13.2.1, pp. 58— 60, T K 2798. G49 1964

Primary Examiner—Volodymyr Y. Mayewsky
Attorney—Harry M. Saragovitz, Edward J. Kelly, Herbert Berl and James T. Deaton ABSTRACT: An electronic delay squib circuit that has two batteries wherein one battery is utilized for charging a delay element and the other battery for providing power for the squib. A first battery provides energy to an electronic delay element and is of the primary nonreserve type such as a silver oxide cell. The second battery provides a high energy output sufficient to fire the electroexplosive squib and is of the primary reserve type such as a thermal or setback activated battery.

PATENTED DEC 22 1970
3,548,749
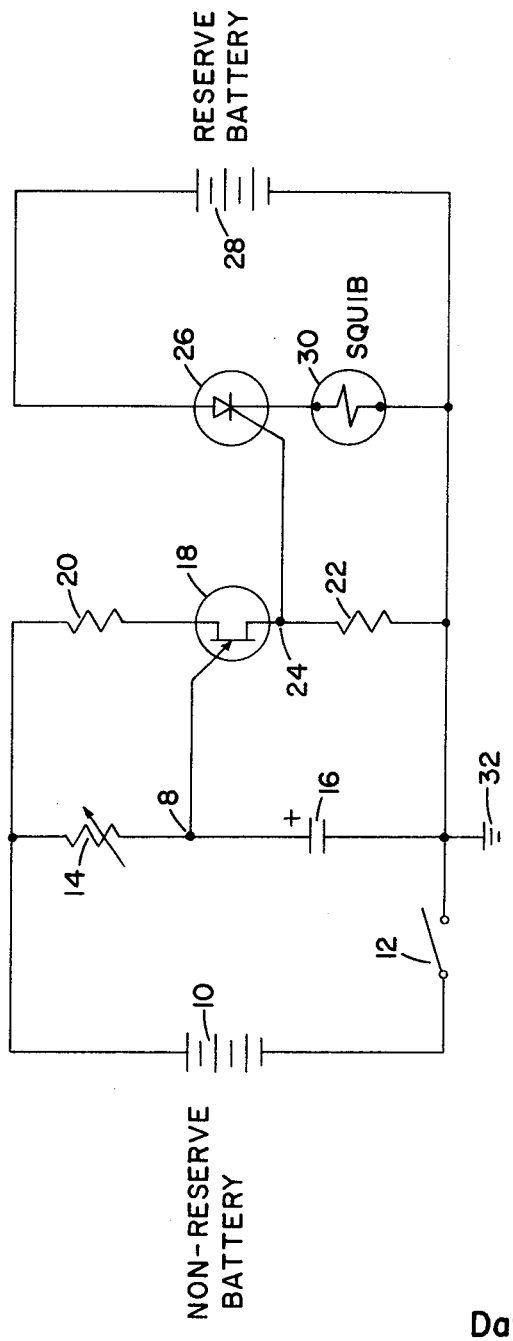
David R. Dreitzler,
INVENTOR
Harry M. Saragovitz
Edward J. Kelly
Herbert Berl
BY James T. Deaton

3,548,749

TWO BATTERY TIME DELAY SQUIB CIRCUIT

BACKGROUND OF THE INVENTION

This invention is in the field of electronic delay squibs utilized in missile boost-coast-boost type of propulsion system. In order for a missile to function accurately, it is required that the second boost stage be ignited at a precise time interval after the first boost phase. Various techniques, such as pyrotechnic and mechanical delay elements have been used but have not provided the desired delay time in a military environment.

SUMMARY OF THE INVENTION

This invention is an electronic delay squib that has a delay circuit and two battery power supplies as an integral part. The first battery power supply provides energy to the delay circuit when a switch is closed connecting them together. The switch may be any appropriate type used to switch a circuit after a missile launch. After the switch is closed for a predetermined time, a solid state pulser will be charged to a necessary value for causing a voltage pulse at its output. The voltage pulse at the output of the pulser activates a solid state switching circuit. The solid state switching circuit connects the second battery across a load circuit for activation thereof.

BRIEF DESCRIPTION OF THE DRAWING

The single FIG. is a schematic diagram of a preferred embodiment of this invention.

DESCRIPTION OF THE PREFERRED EMBODIMENT

Referring now to the drawing, a nonreserve type battery 10 of the silver oxide type provides voltage to a timing circuit consisting of variable resistor 14 and capacitor 16 when switch 12 is closed. Switch 12 is closed sometime during the first boost phase of the missile flight. Simultaneously, a reserve battery 28 of the thermal type is activated by some means such as by percussion or electroexplosive squib. The timing circuit, consisting of variable resistor 14 and capacitor 16, will charge toward the positive voltage of battery 10 at the junction 8 between resistor 14 and capacitor 16. When the voltage at junction 8 becomes positive enough, unijunction transistor 18 will fire. When this positive voltage from ground 32 to the positive side of capacitor 16, at junction 8, reaches the peak voltage of the unijunction transistor 18, a voltage pulse is produced from ground 32 to junction 24 on the top side of resistor 22. Resistor 20 is provided for temperature compensation of the delay circuit. Reserve battery 28 has been activated by the percussion or electroexplosive squib means from the time that switch 12 has been closed. At this time the reserve battery 28 is in condition to fire load 30, which is a squib bridgewire. Load 30 is isolated from reserve battery 28 by silicon control rectifier 26. When the delay circuit is charged by closing of switch 12, the pulse produced from ground 32 to junction 24 is applied to the gate of silicon control rectifier 26. Silicon control rectifier 26 will then conduct switching the reserve battery 28 across load 30 and cause the squib bridgewire to ignite and activate the second boost phase.

While the invention has been described with reference to the preferred embodiment thereof, it will be apparent that various modifications and other embodiments thereof will occur to those skilled in the art within the scope of the invention. For instance, a lower buildup voltage firing device such as a tunnel diode may be substituted for unijunction transistor 18 if it is desired for the squib to be fired in less time. Alternately, battery 28 may be a setback activated battery instead of a thermally activated battery. Accordingly, I desire the scope of my invention to be limited only by the appended claims.

I claim:

1. An electronic delay squib circuit for igniting and activating the second boost phase of a missile, comprising: a first power source consisting of a silver oxide cell battery of the primary nonreserve type; an electronic delay element consisting of a variable resistor and a capacitor; a switching means for switching said first power source across said electronic delay element; a second power source, said second power source being a thermally activated battery of the primary reserve type; a unijunction transistor solid state pulser having an input and an output terminal, said input terminal connected to a junction between said variable resistor and said capacitor of said electronic delay element; a solid state switching circuit having a control element and a squib connected in series therewith, said series connection of said solid state switching circuit and said squib being connected across said second power source with the control element being connected to said output terminal of said solid state pulser for switching said squib across said second power source.

2. An electronic delay squib as set forth in claim 1 wherein said second power source is a setback activated battery of the primary reserve type.